(12) United States Patent  
Mahowald et al.

(10) Patent No.: US 7,426,348 B2
(45) Date of Patent: Sep. 16, 2008

(54) CALIBRATING AN OPTICAL TRANSCEIVER VIA ADAPTIVE TESTING

(75) Inventors: Peter H. Mahowald, Las Altos, CA (US); Wingra T. Fang, Saratoga, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 925 days.

(21) Appl. No.: 10/346,913

(22) Filed: Jan. 15, 2003

(65) Prior Publication Data

US 2004/0136722 A1 Jul. 15, 2004

(51) Int. Cl.
*H04B 10/00* (2006.01)
(52) U.S. Cl. .................. 398/135; 398/136; 398/138
(58) Field of Classification Search ............... 398/135, 398/136, 138, 128, 130
See application file for complete search history.

(56) References Cited

U.S. PATENT DOCUMENTS

| | | | |
|---|---|---|---|
| 4,921,347 A | 5/1990 | Wong et al. | |
| 5,345,230 A | 9/1994 | Jackson et al. | |
| 5,650,612 A * | 7/1997 | Criswell et al. | 250/226 |
| 5,696,777 A * | 12/1997 | Hofsaess | 714/820 |
| 6,069,697 A | 5/2000 | Tanimoto et al. | |
| 6,347,222 B1 | 2/2002 | Niemela | |
| 6,494,370 B1 * | 12/2002 | Sanchez | 235/454 |
| 6,512,419 B1 | 1/2003 | Adams et al. | |
| 6,512,617 B1 | 1/2003 | Tanji et al. | |
| 6,535,560 B1 | 3/2003 | Masenten | |
| 6,538,901 B1 | 3/2003 | Hung | |
| 6,605,769 B1 | 8/2003 | Juszkiewicz | |

FOREIGN PATENT DOCUMENTS

| | | |
|---|---|---|
| EP | 0326309 | 8/1989 |
| EP | 0875747 | 11/1998 |
| WO | WO-01/04871 | 1/2001 |
| WO | WO01/048471 | 7/2001 |

* cited by examiner

*Primary Examiner*—M. R. Sedighian (57) ABSTRACT

An optical transceiver connectable to a test apparatus. The optical transceiver includes a least one test apparatus interface configured to receive from the test apparatus an input causing at least a first transceiver operating parameter to have a level substantially equal to a known value, at least one sensor configured to measure a level of at least one transceiver operating parameter including the level of the first transceiver operating parameter, a data interface configured to provide a value representative of the level of the first transceiver operating parameter, and a controller. The controller is configured to receive and convert the representative value to an actual value using a defined function having a plurality of predetermined coefficients and to provide the actual value to the test apparatus via the data interface. The controller is further configured to receive from the test apparatus via the data interface a plurality of replacement coefficients determined by comparing the actual value to the known value.

41 Claims, 3 Drawing Sheets

CALIBRATING AN OPTICAL TRANSCEIVER VIA ADAPTIVE TESTING

THE FIELD OF THE INVENTION

The present invention relates generally to optical transceivers, and more particularly to optical transceivers employing a transmitter and receiver in conjunction with a controller to monitor transceiver operating parameters.

BACKGROUND OF THE INVENTION

The use of fiber optics technology in data communication continues to expand at a rapid pace. Optic fiber transmission links are used widely in connecting computer, telephone, and instrumentation systems. Fiber optic systems have tremendous advantages over systems utilizing copper conductors. Besides being smaller and lighter than copper conductor systems, fiber optic systems offer total electrical isolation, extremely high speed wideband capability, and complete immunity to both noise and the broad spectrum of interference. Most importantly, fiber optic communication links are much less expensive than copper conductor systems.

A basic fiber optic communication link has three components: a transmitter, a receiver, and a fiber optic cable. The transmitter contains a light-emitting element that converts an electrical current into an optical signal. The light emitting element is typically a light-emitting diode, a laser diode, or a vertical cavity surface-emitting laser. The receiver contains a light-detecting element that converts the light signal back into an electrical current. The light-detecting element is commonly a positive-intrinsic-negative photodiode (PIN diode). The fiber optic cable connects the transmitter to the receiver and carries the optical signal between them.

More commonly, however, a fiber optic link comprises a pair of optical transceivers coupled by a pair of fiber optic cables. An optical transceiver combines a transmitter with a receiver to form a single unit that provides all required electrical/optical conversions necessary to both transmit and receive optical data. The transmitter of the first transceiver sends data in the form of an optical signal via one of the fiber optic cables to the receiver of the second transmitter which subsequently converts the optical signal to an electrical signal. Likewise, the transmitter of the second transceiver sends an optical signal via the other fiber optic cable to the receiver of the first transceiver.

One important task that must be performed by an optical transceiver module is to provide real-time monitoring and measurement of various transceiver operating conditions and parameters, and to provide these measurements to a user in a readable format. Examples of such conditions and parameters are the transceiver module operating temperature, the transceiver supply voltage, the laser biasing current, the optical input power, and the optical output power. Historically, optical transceiver modules have been constructed as "hard-coded" integrated circuits (IC's). In other words, individual circuits comprising a plurality of transistors are designed into the IC with each circuit dedicated to carrying out a single task related to the control and operation of the transceiver. Thus, one circuit is likely dedicated to monitoring and reporting each of the individual values mentioned above.

While such circuits provide for high speed transceiver module operation, they can be very complex and, thus, difficult to design and manufacture. Additionally, each circuit must be specifically designed to meet customer specific design criteria. In order to ensure that these circuits are properly designed and provide accurate data, each IC is tested after manufacture. If the IC fails to meet required design performance criteria, the IC is redesigned, re-manufactured, and re-tested unit the required design performance is met. Such an approach can be very costly and result in substantial delays in manufacturing, as each cycle can take from six to twelve months to complete. Thus, each time an IC fails to meet design requirements can result in a six to twelve month delay in delivery of the product.

Optical data systems would benefit from an optical transceiver module that can be more easily adjusted to provide more accurate monitoring and measurement of transceiver operating conditions and to meet customer specific design requirements.

SUMMARY OF THE INVENTION

One aspect of the present invention provides an optical transceiver connectable to a test apparatus. The optical transceiver includes at least one test apparatus interface configured to receive from the test apparatus an input causing at least a first transceiver operating parameter to have a level substantially equal to a known value, at least one sensor configured to measure a level of at least one transceiver operating parameter including the level of the first transceiver operating parameter, a data interface configured to provide a value representative of the level of the first transceiver operating parameter, and a controller. The controller is configured to receive and convert the representative value to an actual value using a defined function having a plurality of predetermined coefficients and to provide the actual value to the test apparatus via the data interface. The controller is further configured to receive from the test apparatus via the data interface a plurality of replacement coefficients determined by comparing the actual value to the known value.

DESCRIPTION OF THE PREFERRED EMBODIMENTS

In the following detailed description of the preferred embodiments, reference is made to the accompanying drawings that form a part hereof and show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined b the appended claims.

Figure 1:
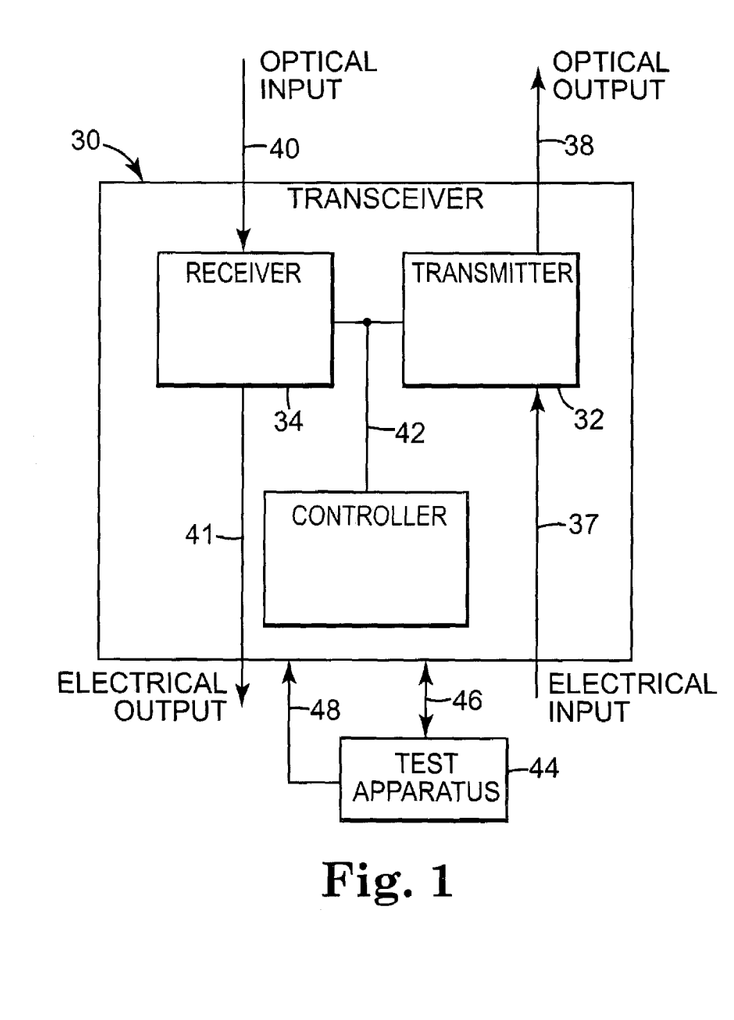
FIG. 1 is a block diagram illustrating one embodiment of an optical transceiver module according to the present invention.

An optical transceiver module according to the present invention is illustrated generally at 30 in FIG. 1. Optical transceiver module 30 includes a transmitter 32, a receiver 34, and a controller 36. Transmitter 32 is configured to receive an electrical input signal via a path 37 and to convert the electrical input signal to an optical output signal at optical fiber 38. Receiver 34 is configured to receive an optical input signal via an optical fiber 40 and to convert the optical input signal to an electrical output signal at path 41. Controller 36 is coupled to and communicates with transmitter 32 and receiver 34 via a path 42. Transceiver module 30 is connectable to and configured to communicate with an external test apparatus 44 via a path 46. Transceiver module 30 is further configured to receive from test apparatus 44 at a test interface 48 a test output causing at least one optical transceiver module operating parameter to have a level substantially equal to a known value. Examples of transceiver operating parameters include optical input signal power, optical output signal power, and transceiver module temperature.

Transmitter 32 and receiver 34 are configured to measure a level of a plurality of transceiver operating parameters, including a level of the at least one transceiver operating parameter, and are further configured to provide a value that is representative of the level of the at least one transceiver operating parameter. Controller 36 is configured to receive the representative value of the level of the at least one operating parameter via path 38 and to convert the representative value to an actual value using a defined function having a plurality of predetermined coefficients. Controller 36 is further configured to provide the actual value to test apparatus 44 via a data interface 46. Furthermore, controller 36 is configured to receive from test apparatus 44 via path 46 a plurality of replacement coefficients determined by comparing the actual value to the known value, such that when controller 36 converts the representative value of the level of the at least one transceiver operating parameter to an actual value using the defined function employing the replacement coefficients the actual value is substantially equal to the known value. In one embodiment, controller 36 is further configured to provide the representative value of the level of the at least one operating parameter to a customer interface via external connection 86.

In one embodiment, test apparatus 44 includes at least one test interface, such as test interface 44, configured to provide a test output causing at least a first optical transceiver module operating parameter to have a level substantially equal to a known value. Test apparatus 44 further includes a data interface, such as data interface 46, configured to receive from optical transceiver module 30 a monitoring signal indicative of an actual value of the first transceiver operating parameter. Test apparatus 44 further includes a test controller configured to compare the actual value to the known value and to determine the plurality of replacement coefficients if the actual value is not within a desired range of the known value.

By utilizing "hard-coded" transmitter and receiver circuits 32 and 34 in conjunction with a "tunable" function of controller 36, optical transceiver module 30 according to the present invention can more easily be adjusted, or tuned, to provide accurate measurement and reporting of transceiver operating parameters than conventional designs using only hard-coded circuits.

Figure 2:
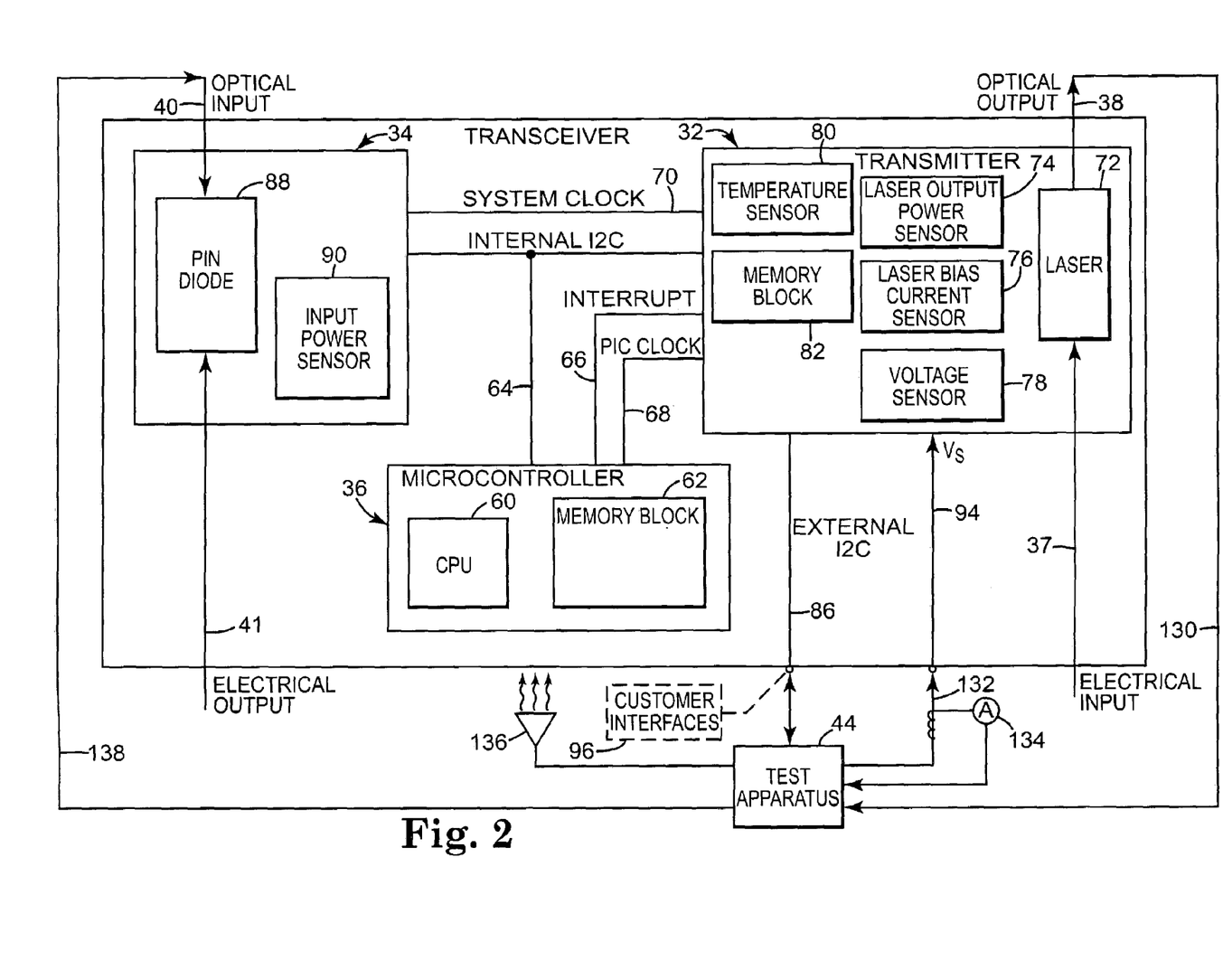
FIG. 2 is a block diagram illustrating one embodiment of an optical transceiver module according to the present invention.

FIG. 2 illustrates one exemplary embodiment of optical transceiver module 30 according to the present invention. Optical transceiver module 30 includes transmitter 32, receiver 34, and controller 36, which in one embodiment is a microcontroller comprising a central processing unit (CPU) 60 and a memory block 62. In one embodiment, memory block 62 is an electrically erasable programmable read only memory (EEPROM) device. Microcontroller 36 is electrically coupled to transmitter 34 and receiver 36 via an internal connection 64, which is any suitable type of serial or parallel connection, such as a two-wire serial connection. One suitable two-wire connection is an I2C connection as provided by the I2C-Bus Specification available from Phillips Semiconductor at http://www.semiconductors.philips.com/acrobat/various/I2C_Bus_Specification_3.pdf. When internal connection 64 is an I2C connection, transmitter 32, receiver 34, and microcontroller 36 each include an I2C interface as described by the Phillips reference above. In one embodiment, optical transceiver module 30 conforms to the SFF-8472 Specification for Diagnostic Monitoring Interface for Optical Transceivers.

Transmitter 32 includes a laser 72, a laser output power sensing circuit 74, a laser bias current sensing circuit 76, a voltage sensing circuit 78, a temperature sensing circuit 80, and a memory block 82. In one embodiment, transmitter 32 is an integrated circuit. In one embodiment, laser 72 is a vertical cavity surface emitting laser (VCSEL) which is connectable to and provides an optical output signal via an optical fiber 38. In one embodiment, memory block 82 is a static random access memory (SRAM) device. In one embodiment, transmitter 32 is connectable to external test apparatus 44 via an external connection 86. External connection 86 is any suitable type of serial or parallel connection, such as a two-wire serial connection. One suitable two-wire connection is an I2C connection as provided by the I2C-Bus Specification available from Phillips Semiconductor at http://www.semiconductors.philips.com/acrobat/various/I2C_Bus_Specification_3.pdf. When external connection 64 is an I2C connection, transmitter 32 and test apparatus 44 include an I2C interface as described the Phillips reference. When internal connection 64 and external connection 86 are configured as I2C connections, transmitter memory block 82 is utilized as a buffer, and microcontroller 36 and test apparatus 44 communicate via internal connection 64, memory block 82, and external connection 86 using standard I2C protocol.

Receiver 34 further includes a positive-intrinsic-negative photodiode (PIN diode) 88 and an optical input power sensing circuit 90. PIN diode 88 is connectable to and detects an optical input signal received via an optical fiber 40 and converts the optical input signal to an electrical signal. In one embodiment, receiver 34 is an integrated circuit.

Laser output power sensing circuit 74 is configured to measure and provide a value representative of average optical output power provided by laser 72. In one embodiment, laser output power sensing circuit 74 comprises a photodiode that samples the optical output signal provided by laser 72 and provides a current having a value representative of the optical output power of laser 72. Laser bias current sensing circuit 76 is configured to measure and provide to a value representative of an average bias current of laser 72. Voltage sensing circuit 78 is configured to measure and provide a value representative of a supply voltage ($V_s$) 94 to transmitter 32. Temperature sensing circuit 80 is configured to measure and provide a value representative of the temperature of optical transceiver module 30. Input power sensing circuit 88 is configured to measure and provide a value representative of an average power of the optical input signal. In one embodiment, input power sensing circuit 90 comprises a photodiode that samples the optical input signal received by PIN diode 88 and provides a current having a value representative of the power of the optical input signal.

In one embodiment, each of the above described sensing circuits 74, 76, 78, 80, and 90 includes an analog-to-digital converter to convert the representative value of the measured transceiver operating from an analog value to a digital value. The digital form of the above described representative values can be read via internal connection 64 by microcontroller 36 which converts them to "real world" values that may be uploaded to a customer interface 96 connectable to external connection 86. When internal connection 64 and external connection 86 are configured as I2C connections, transmitter memory block 62 is utilized as a buffer, and microcontroller 36 and test apparatus 44 communicate via internal connection 64, memory block 62, and external connection 86 using standard I2C protocol.

In one embodiment, microcontroller 36 employs Equation I below to convert the digital values representative of the laser output power, laser biasing current, transceiver supply voltage, and transceiver temperature to real world values.

Real World Value=(Sensing Circuit Value)*(Gain)+ Offset,                 Equation I where Sensing Circuit Value=digital value provided by sensing circuit,
    Gain=a value stored in memory block 62; and
    Offset=a value stored in memory block 62.

The values for the "gain" and "offset" coefficients of Equation I are stored in memory block 62 as part of a manufacturing process. The values of the coefficients vary depending on the transceiver operating parameter to be calculated, with each operating parameter having a unique set of "gain" and "offset" coefficients stored in memory block 62.

In one embodiment, microcontroller 36 employs the following process to convert the digital value representative of the optical input signal power provided by input power sensing circuit 90. Microprocessor 36 first employs Equation II below to adjust the representative value for a present temperature, using the temperature of transceiver module 30 as measured by temperature sensing circuit 80.

Adjusted Value=(Sensing Circuit Value)*(1+ TEMPCO*(T−32C))                 Equation II where TEMPCO=a constant stored in memory block 62; and
    T=transceiver temperature as measure by sensing circuit 78.

Microprocessor 36 then determines a "real world" value of the optical input power by using the temperature-adjusted value as an index to a look-up table stored in memory block 62 and containing "real world" values of the optical input power corresponding to a plurality of temperature-adjusted values. In one embodiment, when the representative value does not directly correspond to a discrete table entry, microprocessor 36 interpolates between discrete table entries that bound the representative value to determine a real world optical input power level. In one embodiment, Equation II is utilized to temperature-adjust the value determined from the look-up table rather than the representative value read from power sensing circuit 90.

As described above, the optical input power value determined by Equation II above, along with the real world values of the other transceiver operating parameters determined by application of Equation I above, may be uploaded to a customer interface 96 connectable to external connection 86. However, to ensure that the real world values of the transceiver operating parameters provided to customer interface 96 by microprocessor 36 are accurate, a calibration process according to the present invention is employed to "tune" Equations I and II by adjusting their associated coefficients.

Figure 3:
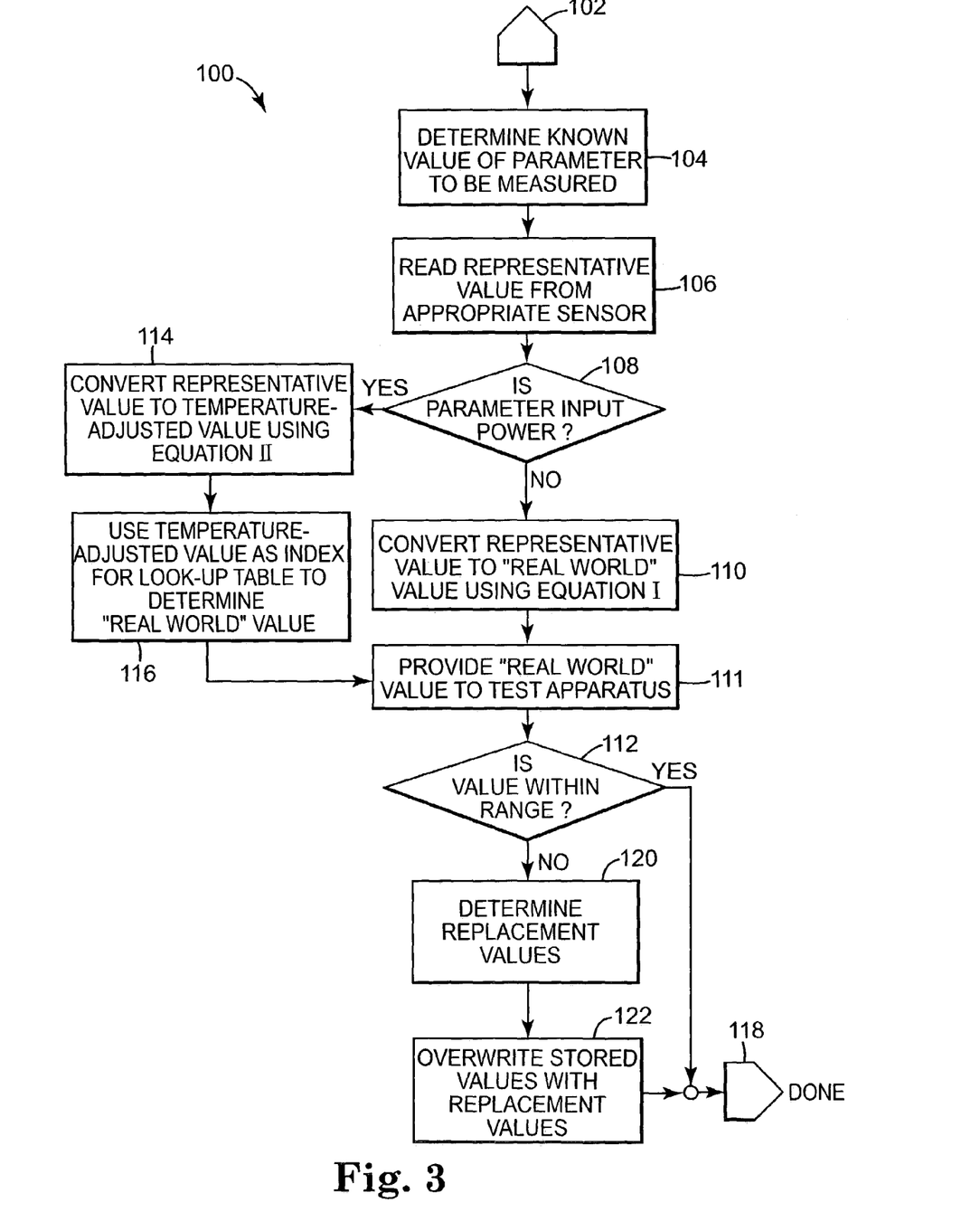
FIG. 3 is a flowchart illustrating one exemplary embodiment of a process 100 to calibrate optical transceiver module 30 according to the present invention to provide accurate measurement of transceiver operating parameters.

FIG. 3 is a flowchart illustrating one exemplary embodiment of a process 100 to calibrate optical transceiver module 30 according to the present invention to provide accurate measurement of transceiver operating parameters. Process 100 starts at starts at 102 and proceeds to step 104 where a known value for an operating parameter to be measured is determined. In one embodiment, this is done by measuring the transceiver operating parameter with a test apparatus that is known to be properly calibrated, such as test apparatus 44. In one embodiment, an input is provided by a test apparatus, such as test apparatus 40, to transceiver module 30 that will cause the operating parameter being measured to have a known value.

Process 100 then proceeds to step 106, where microcontroller 36 reads from the appropriate sensing circuit a value that is representative of the value of the transceiver operating parameter being measured. Process 100 then proceeds to step 108, where it is queried whether the parameter being measured is the optical input signal power as measured by input power sensing circuit 90. If the answer to the step 108 query is "no," process 100 proceeds to step 110 where microcontroller 36 converts the representative value to a "real world" value using Equation I. Process 100 then proceeds to step 111.

If the answer to the step 108 query is "yes," process 100 proceeds to step 114 where microcontroller 36 employs Equation II to adjust the representative value of the input power for a present temperature of transceiver module 30. Process 100 then proceeds to step 116 where microcontroller 36 uses the temperature-adjusted value as an index for a loop-up table stored in memory block 62 to determine a "real world" value for the optical input power. As described above, the look-up table contains an index of predetermined "real world" values for the optical input power that correspond to a plurality of temperature-adjusted representative values. Process 100 then proceeds to step 111.

At step 111, microcontroller 36 provides the "real world" value to a test apparatus, such as test apparatus 44. Process 100 then proceeds to step 112, where test apparatus 44 queries whether the "real world" value is within an acceptable range of the known value. If the "real world" value is within the acceptable range, the process is complete as indicated at step 118. If the "real world" value is not within the acceptable range, process 100 proceeds to step 120.

At step 120, the test apparatus determines replacement values for either the coefficients of Equation I or for the input power level values contained in the look-up table. Process 100 is then completed at step 122 where the test apparatus provides the replacement values to microcontroller 36 which overwrites the prior values. The replacement values are such that when microcontroller 36 determines the "real world" value using the replacement values, the "real world" value will be within the acceptable range of the known value.

One exemplary embodiment of process 100, as used to calibrate the laser output power value, is described below. As part of step 104, test apparatus 44 is connected to laser 72 via an optical fiber 130 to thereby measure and determine a known value of the output power of optical output signal. At step 106, microcontroller 36 reads a representative value of the laser output power from laser output sensing circuit 74 via internal connection 64. Microcontroller 36 then converts the representative value to a real world value using Equation I, as indicated at step 110. At step 111, microcontroller 36 writes the real world value for the optical output power level to transmitter memory block 62 via internal connection 64, where it is subsequently read by test apparatus 44 via external connection 86.

At step 112, test apparatus 44 compares the real world value to the known value determined via optical fiber connection 130. If the real world value is within a desired range of the known value, the process is complete. If the real world value is not within a desired range of the known value, test apparatus 44 determines a set of replacement coefficients for Equation I, as indicated at step 120, such that when microcontroller 36 calculates the real world value of the optical output using Equation I employing the replacement coefficients, the real world value will be within the desired range of the known value.

To complete the process at step 122, test apparatus 44 writes the replacement coefficients to memory block 62 via external connection 86, where they are subsequently read by microcontroller 36 via internal connection 64. Microcontroller then replaces the coefficients for Equation I associated with the calculation of the optical output power stored in memory block 62 with the replacement coefficients.

One exemplary embodiment of process 100, as used to calibrate the supply voltage value, is described below. As part of step 104, test apparatus 44 provides a known supply voltage to transceiver 30 via a power connection 132. At step 106, microcontroller 36 reads a representative value of the supply voltage from voltage sensing circuit 78 via internal connection 64. Microcontroller 36 then converts the representative value to a real world value using Equation I, as indicated at step 110. At step 111, microcontroller 36 writes the real world value for the supply voltage level to transmitter memory block 62 via internal connection 64, where it is subsequently read by test apparatus 44 via external connection 86.

At step 112, test apparatus 44 compares the real world value to the known value supplied via connection 132. If the real world value is within a desired range of the known value, the process is complete. If the real world value is not within a desired range of the known value, test apparatus 44 determines a set of replacement coefficients for Equation I, as indicated at step 120, whereby when microcontroller 36 calculates the real world value of the supply voltage using Equation I employing the replacement coefficients, the real world value will be within the desired range of the known value.

To complete the process at step 122, test apparatus 44 writes the replacement coefficients to memory block 62 via external connection 86, where they are subsequently read by microcontroller 36 via internal connection 64. Microcontroller then replaces the coefficients for Equation I associated with the calculation of the supply voltage stored in memory block 62 with the replacement coefficients.

One exemplary embodiment of process 100, as used to calibrate the laser bias current value, is described below. At step 104, test apparatus 44 measures a known value of the laser bias current by measuring with an ammeter 134 a supply current being drawn by transmitter 32 at power connection 100. Test apparatus measures the supply current when the laser 72 is providing an optical output signal and again when laser 72 is turned off. Test apparatus 44 then determines a known value for the laser bias current by determining the difference between the two values measured by ammeter 102.

At step 106, microcontroller 36 reads via internal connection 64 a representative value of the laser bias current from laser bias sensing circuit 76 while laser 72 is providing an optical output signal 84. At step 110, microcontroller 36 converts the representative value to a real world value using Equation I. At step 111, microcontroller 36 writes the real world value for the optical output power level to transmitter memory block 62 via internal connection 64, where it is subsequently read by test apparatus 44 via external connection 86.

At step 112, test apparatus 44 compares the real world value to the known value as determined above. If the real world value is within a desired range of the known value, the process is complete. If the real world value is not within a desired range of the known value, the process proceeds to step 120 where test apparatus 44 determines a set of replacement coefficients for Equation I, whereby when microcontroller 36 calculates the real world value of the laser bias current using Equation I employing the replacement coefficients, the real world value will be within the desired range of the known value.

The process is completed at step 122, where test apparatus 44 writes the replacement coefficients to memory block 62 via external connection 86, where they are subsequently read by microcontroller 36 via internal connection 64. Microcontroller then replaces the coefficients for Equation I associated with the calculation of the laser bias current stored in memory block 62 with the replacement coefficients.

One exemplary embodiment of process 100, as used to calibrate the temperature value, is described below. At step 104, test apparatus 44 heats optical transceiver module 30 to a known temperature value via a temperature control apparatus 136. At step 106, microcontroller 36 reads a representative value of the temperature of transceiver module 30 from temperature sensing circuit 80 via internal connection 64. At step 110, microcontroller 36 converts the representative value to a real world value using Equation I. At step 111, microcontroller 36 writes the real world value for the transceiver temperature level to transmitter memory block 62 via internal connection 64, where it is subsequently read by test apparatus 44 via external connection 86.

At step 112, test apparatus 44 compares the real world value to the known value provided by temperature control apparatus 136. If the real world value is within a desired range of the known value, the process is complete. If the real world value is not within a desired range of the known value, the process proceeds to step 120 where test apparatus 44 determines a set of replacement coefficients for Equation I, whereby when microcontroller 36 calculates the real world value of the transceiver temperature using Equation I employing the replacement coefficients, the real world value will be within the desired range of the known value.

The process is completed at step 122 where test apparatus 44 writes the replacement coefficients to memory block 62 via external connection 86, where they are subsequently read by microcontroller 36 via internal connection 64. Microcontroller then replaces the coefficients for Equation I associated with the calculation of transceiver module 30 temperature stored in memory block 62 with the replacement coefficients.

One exemplary embodiment of process 100, as used to calibrate the optical input signal power value, is described below. At step 104, test apparatus 44 provides an optical input signal having a known power level to receiver 34 via an optical fiber 138. At step 106, microprocessor 36 reads a representative value of the optical input signal power level from input power sensing circuit 90 via internal connection 64. The process then proceeds to step 114, where microcontroller 36 reads a representative value of the temperature of transceiver module 30 from temperature sensing circuit 80, and applies this value along with the representative value of the input power, to Equation II to determine a temperature-adjusted representative value.

At step 116, where microcontroller 36 uses the temperature-adjusted representative value of the optical input signal power level to determine a corresponding real world value from a look-up table stored in memory block 62. At step 111, microcontroller 36 writes the "real world" value of the optical input power level to transmitter memory block 62 via internal connection 64, where it is subsequently read by test apparatus 44 via external connection 86.

The process then proceeds to step 112, where test apparatus 44 compares the "real world" value of the optical input power to the known value being provided to receiver 34 via optical fiber 138. If the real world value is within a desired range of the known value, the process is complete. If the real world value of the is not within a desired range of the known value, the process proceeds to step 120 where test apparatus 44 determines a replacement look-up table, such that when microcontroller 36 determines the real world value of the optical input power via the look-up table containing the replacement values, the real world value will be within the desired range of the known value.

The process is completed at step 122, where test apparatus 44 writes the replacement look-up table values to memory block 62 via external connection 86, where it they are subsequently read by microcontroller 36 via internal connection 64. Microcontroller then replaces the look-up table values associated with the calculation of the optical input power level stored in memory block 62 with the replacement look-up table values.

By utilizing "hard-coded" transmitter and receiver circuits 32 and 34 in conjunction with a "tunable" function of controller 36, optical transceiver module 30 according to the present invention can more easily be adjusted, or tuned, to provide accurate measurement and reporting of transceiver operating parameters than conventional designs using only hard-coded circuits. Thus, optical transceiver module 30 according to the present invention can be more easily tuned to operate in each customer's unique operating environment, which in results in the elimination of costly manufacturing delays while simultaneously providing more accurate operation.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An optical transceiver module connectable to a test apparatus, the transceiver comprising:
   a transmitter;
   a receiver;
   at least one test apparatus interface configured to receive from the test apparatus an input causing at least a first transceiver operating parameter to have a level substantially equal to a known value;
   at least one sensor configured to provide a measured level indicative of at least one transceiver operating parameter including a measured level of the first transceiver operating parameter;
   a data interface configured to provide a representative value of the measured level of the first transceiver operating parameter; and
   a controller configured to receive and convert the representative value to an actual value using a defined function having a plurality of coefficients having predetermined values, to provide the actual value to the test apparatus via the data interface, and configured to receive from the test apparatus via the data interface a plurality of replacement values for the plurality of coefficients determined by comparing the actual value to the known value.

2. The optical transceiver module of claim 1, wherein when the controller converts the representative value to an actual value using the defined function employing the plurality of replacement coefficients the actual value is substantially equal to the known value.

3. The optical transceiver module of claim 1, wherein the controller is coupled to the transmitter and receiver via an internal bus.

4. The optical transceiver module of claim 3, wherein the internal bus comprises a two-wire serial bus.

5. The optical transceiver module of claim 1, wherein the transmitter is connectable to the test apparatus via an external bus.

6. The optical transceiver module of claim 5, wherein the external bus comprises a two-wire serial bus.

7. The optical transceiver module of claim 5, wherein the transmitter is connectable a customer interface in lieu of the test apparatus.

8. The optical transceiver module of claim 1, wherein the controller comprises:
   a microcontroller comprising:
      a memory block; and
      a central processing unit.

9. The optical transceiver module of claim 8, wherein the memory block comprises an electrically erasable programmable read only memory (EEPROM) device.

10. The optical transceiver module of claim 8, wherein the memory block comprises a flash memory device.

11. The optical transceiver module of claim 1, wherein the transmitter comprises an integrated circuit.

12. The optical transceiver module of claim 1, wherein the transmitter comprises:
   a light-emitting element and is configured to receive and convert an electrical signal to an optical signal.

13. The optical transceiver module of claim 1, wherein the receiver comprises:
   a light-detecting element and is configured to receive and convert an optical signal to an electrical signal.

14. The optical transceiver module of claim 12, wherein the light-emitting element comprises a laser.

15. The optical transceiver module of claim 12, wherein the light-emitting element comprises a vertical cavity surface emitting laser (VSCEL).

16. The optical transceiver module of claim 14, wherein the transmitter further comprises:
   a power sensing circuit configured to measure and provide a value of the laser's average power.

17. The optical transceiver module of claim 14, wherein the transmitter further comprises:
   a bias current sensing block configured to measure and provide a value of the laser's average bias current.

18. The optical transceiver module of claim 1, wherein the transmitter further comprises:
   a voltage sensing circuit configured to measure and provide a value of a temperature of the optical transceiver module.

19. The optical transceiver module of claim 14, wherein the transmitter further comprises:
   a voltage sensing circuit configured to measure and provide a value of a supply voltage to the optical transceiver module.

20. The optical transceiver module of claim 1, wherein the transmitter further comprises:
   a memory block.

21. The optical transceiver module of claim 20, wherein the memory block comprises an static random access memory (SRAM) device.

22. The optical transceiver module of claim 1, wherein the receiver comprises an integrated circuit.

23. The optical transceiver module of claim 13, wherein the light-detecting element comprises a positive-intrinsic-negative photodiode (PIN diode).

24. The optical transceiver module of claim 1, wherein the receiver further comprises:
 a power sensing circuit configured to measure and provide a value of the power of a received optical signal.

25. A method of calibrating an optical transceiver module, the method comprising:
 causing at least one optical transceiver module operating parameter to have a level substantially equal to a known value;
 receiving a monitoring signal having a representative value of the level of the at least one optical transceiver module operating parameter;
 converting the representative value to an actual value using a defined function having a plurality of coefficients having predetermined values;
 comparing the actual value to the known value; and
 determining replacement values for the plurality of coefficients if the actual value is not within a desired range of the known value.

26. The method of claim 25 further comprising:
 replacing the predetermined values of the plurality of coefficients with the replacement values.

27. The method of claim 1, wherein the optical transceiver module comprises a laser, and the method further comprises:
 measuring and providing a value of the laser's average power.

28. The method of claim 27, further comprising:
 measuring and providing a value of the laser's average bias current.

29. The method of claim 25, further comprising:
 measuring and providing a value of the optical transceiver module temperature.

30. The method of claim 25, further comprising:
 measuring and providing a value of a supply voltage to the optical transceiver module.

31. The method of claim 25, further comprising:
 measuring and providing a value of the power of a received optical signal.

32. A test system comprising:
 an optical transceiver module comprising
  at least one test interface configured to receive a test input causing at least a first transceiver operating parameter to have a value substantially equal to a known value;
  at least one sensor configured to provide a monitoring signal having a value representative of the level of the at least one optical transceiver module operating parameter;
  a controller configured to receive and convert the representative value to an actual value using a defined function having a plurality of coefficients having predetermined values, and to provide the actual value via a data interface; and
 a test apparatus configured to provide the test input to the test interface, to receive the actual value via the data interface, to compare the actual value to the known value, and to determine a replacement values for the plurality of coefficients if the actual value is not within a desired range of the known value.

33. The test system of claim 32, wherein the test apparatus is further configured to provide the replacement values for the plurality of coefficients to the controller via the data interface.

34. The test system of claim 33, wherein the controller is further configured to replace the predetermined values for the plurality of coefficients with the replacement values.

35. A test apparatus connectable to an optical transceiver module, the test apparatus comprising:
 at least one test interface configured to provide a test output causing at least a first transceiver operating parameter to have a level substantially equal to known value;
 a data interface configured to receive from the optical transceiver module a monitoring signal indicative of an actual value of the first transceiver operating parameter determined by using a defined function having a plurality of coefficients having predetermined values to convert a value representative of the level of the first transceiver operating parameter measured by a sensor; and
 a test controller configured to compare the actual value to the known value, and to determine replacement values for the plurality of coefficients if the actual value is not within a desired range of the known value.

36. The test apparatus of claim 35, wherein the controller is further configured to provide the replacement values for the plurality of coefficient to the optical transceiver module via the data interface.

37. The test apparatus of claim 35 further comprising:
 a temperature control device configured to set a temperature of the optical transceiver module to a known value.

38. The test apparatus of claim 35 further comprising:
 a power supply configured to provide a supply voltage having a known voltage level to the optical transceiver module.

39. The test apparatus of claim 35 further comprising:
 a test transmitter configured to provide an optical signal having a known power level to the optical transceiver module.

40. The test apparatus of claim 35 further comprising:
 a test receiver configured to receive an optical signal from the optical transceiver module.

41. The test apparatus of claim 35 further comprising:
 an ammeter configured to measure a supply current to the optical transceiver module.

* * * * *

UNITED STATES PATENT AND TRADEMARK OFFICE
CERTIFICATE OF CORRECTION

PATENT NO. : 7,426,348 B2  Page 1 of 1
APPLICATION NO. : 10/346913
DATED : September 16, 2008
INVENTOR(S) : Peter H. Mahowald et al.

It is certified that error appears in the above-identified patent and that said Letters Patent is hereby corrected as shown below:

Title page, Col. 1, (Inventors), Line 1, delete "Las Altos," and insert -- Los Altos, --;

Title page, Col. 2, (Abstract), Line 2, delete "a least" and insert -- at least --;

Column 10, Line 17, Claim 7, after "connectable" insert -- to --;

Column 10, Line 66, Claim 21, delete "an" and insert -- a --;

Column 11, Line 45, Claim 32, delete "comprising" and insert -- comprising: --;

Column 12, Line 5, Claim 32, delete "value-via" and insert -- value via --;

Column 12, Line 14, Claim 34, delete "for" and insert -- of --;

Claim 27, Line 27 (approx.), after claim, delete "1" and insert -- 25 --.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,426,348 B2 | Page 1 of 1 |
| APPLICATION NO. | : 10/346913 | |
| DATED | : September 16, 2008 | |
| INVENTOR(S) | : Peter H. Mahowald et al. | |

It is certified that error appears in the above-identified patent and that said Letters Patent is hereby corrected as shown below:

Title page, Col. 1, (Inventors), Line 1, delete "Las Altos," and insert -- Los Altos, --;

Title page, Col. 2, (Abstract), Line 2, delete "a least" and insert -- at least --;

Column 10, Line 17, Claim 7, after "connectable" insert -- to --;

Column 10, Line 66, Claim 21, delete "an" and insert -- a --;

Column 11, Line 27 (approx.), Claim 27, after "claim", delete "1" and insert -- 25 --;

Column 11, Line 45, Claim 32, delete "comprising" and insert -- comprising: --;

Column 12, Line 5, Claim 32, delete "value-via" and insert -- value via --;

Column 12, Line 14, Claim 34, delete "for" and insert -- of --;

This certificate supersedes the Certificate of Correction issued June 8, 2010.

Signed and Sealed this

Twenty-ninth Day of June, 2010

David J. Kappos
*Director of the United States Patent and Trademark Office*